(12) United States Patent
Chen et al.

(10) Patent No.: US 9,747,104 B2
(45) Date of Patent: Aug. 29, 2017

(54) UTILIZING PIPELINE REGISTERS AS INTERMEDIATE STORAGE

(71) Applicant: QUALCOMM Incorporated, San Diego, CA (US)

(72) Inventors: Lin Chen, San Diego, CA (US); Yun Du, San Diego, CA (US); Sumesh Udayakumaran, San Diego, CA (US); Chihong Zhang, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 14/275,047

(22) Filed: May 12, 2014

(65) Prior Publication Data
US 2015/0324196 A1    Nov. 12, 2015

(51) Int. Cl.
*G06F 9/30* (2006.01)
*G06F 9/38* (2006.01)

(52) U.S. Cl.
CPC .......... *G06F 9/3012* (2013.01); *G06F 9/3017* (2013.01); *G06F 9/30032* (2013.01); *G06F 9/3869* (2013.01); *G06F 9/3875* (2013.01)

(58) Field of Classification Search
CPC ................................................... G06F 9/3826
USPC .......................................................... 712/225
See application file for complete search history.

(56) References Cited

U.S. PATENT DOCUMENTS

| | | |
|---|---|---|
| 6,052,769 A | 4/2000 | Huff et al. |
| 6,145,075 A | 11/2000 | Henry et al. |
| 6,256,721 B1 | 7/2001 | Witt |
| 6,745,319 B1 * | 6/2004 | Balmer ............... G06F 9/30025 708/212 |
| 7,219,215 B2 | 5/2007 | Ford et al. |
| 2003/0212880 A1 * | 11/2003 | Luick ........................ G06F 1/32 712/225 |

(Continued)

FOREIGN PATENT DOCUMENTS

| | | |
|---|---|---|
| EP | 1351134 A2 | 10/2003 |
| WO | 2013101323 A1 | 7/2013 |

OTHER PUBLICATIONS

Response to Written Opinion dated Jul. 15, 2015, from International Application No. PCT/US2015/026850; filed on Feb. 26, 2016, 26 pp.

(Continued)

*Primary Examiner* — Andrew Caldwell
*Assistant Examiner* — Michael Metzger
(74) *Attorney, Agent, or Firm* — Shumaker & Sieffert, P.A.

(57) ABSTRACT

In one example, a method includes responsive to receiving, by a processing unit, one or more instructions requesting that a first value be moved from a first general purpose register (GPR) to a third GPR and that a second value be moved from a second GPR to a fourth GPR, copying, by an initial logic unit and during a first clock cycle, the first value to an initial pipeline register, copying, by the initial logic and during a second clock cycle, the second value to the initial pipeline register, copying, by a final logic unit and during a third clock cycle, the first value from a final pipeline register to the third GPR, and copying, by the final logic unit and during a fourth clock cycle, the second value from the final pipeline register to the fourth GPR.

24 Claims, 9 Drawing Sheets

(56) References Cited

U.S. PATENT DOCUMENTS

| | | | | |
|---|---|---|---|---|
| 2005/0114634 A1* | 5/2005 | Tam | ................... | G06F 9/30032 |
| | | | | 712/226 |
| 2006/0212686 A1* | 9/2006 | Srinivasan | .............. | G06F 8/445 |
| | | | | 712/226 |
| 2007/0239971 A1* | 10/2007 | Gupte | .................. | G06F 9/3828 |
| | | | | 712/225 |
| 2012/0254591 A1* | 10/2012 | Hughes | ............... | G06F 9/30018 |
| | | | | 712/205 |
| 2013/0275720 A1 | 10/2013 | Keller et al. | | |

OTHER PUBLICATIONS

International Search Report and Written Opinion from International Application No. PCT/US2015/026850, dated Jul. 15, 2015, 11 pp.
International Preliminary Report on Patentability issued by the International Preliminary Examining Authority of the European Patent Organization in International Application No. PCT/US2015/026850 mailed Sep. 8, 2016, 23 pp.

\* cited by examiner

|        | $t_0$ | $t_1$ | $t_2$ | $t_3$ | $t_4$ | $t_5$ |
|--------|-------|-------|-------|-------|-------|-------|
| GPR 4A | $V_A$ |       |       |       |       | $V_B$ |
| GPR 4B | $V_B$ |       |       |       | $V_A$ | $V_A$ |
| PR 8A  | $V_A$ | $V_B$ |       |       |       |       |
| PR 8B  |       | $V_A$ | $V_B$ |       |       |       |
| PR 8C  |       |       | $V_A$ | $V_B$ |       |       |
| PR 8D  |       |       |       | $V_A$ | $V_B$ |       |

FIG. 3A

|  | $t_0$ | $t_1$ | $t_2$ | $t_3$ | $t_4$ | $t_5$ | $t_6$ |
|---|---|---|---|---|---|---|---|
| GPR 4A | $V_A$ | | | | | | |
| GPR 4B | $V_B$ | | | | | | $V_E$ |
| GPR 4C | $V_C$ | | | | $V_B$ | $V_B$ | $V_B$ |
| GPR 4D | $V_D$ | | | | | $V_D$ | $V_D$ |
| GPR 4E | $V_E$ | | | | | | |
| PR 8A | $V_E$ | $V_B$ | $V_D$ | | | | |
| PR 8B | | $V_E$ | $V_B$ | $V_D$ | | | |
| PR 8C | | | $V_E$ | $V_B$ | $V_D$ | | |
| PR 8D | | | | $V_E$ | $V_B$ | $V_D$ | |

FIG. 3B

|  | $t_0$ | $t_1$ | $t_2$ | $t_3$ | $t_4$ | $t_5$ | $t_6$ |
|---|---|---|---|---|---|---|---|
| GPR 4A | $V_A$ |  |  |  |  | $V_B$ | $V_B$ |
| GPR 4B | $V_B$ |  |  |  |  |  |  |
| GPR 4C | $V_C$ |  |  |  |  |  |  |
| GPR 4D | $V_D$ |  |  |  | $V_A$ | $V_A$ | $V_A$ |
| GPR 4E | $V_E$ |  |  |  |  |  | $V_C$ |
| PR 8A | $V_A$ | $V_B$ | $V_C$ |  |  |  |  |
| PR 8B |  | $V_A$ | $V_B$ | $V_C$ |  |  |  |
| PR 8C |  |  | $V_A$ | $V_B$ | $V_C$ |  |  |
| PR 8D |  |  |  | $V_A$ | $V_B$ | $V_C$ |  |

FIG. 3C

UTILIZING PIPELINE REGISTERS AS INTERMEDIATE STORAGE

TECHNICAL FIELD

This disclosure relates to processing units and, more particularly, moving multiple values between general purpose registers of processing units.

BACKGROUND

Processing units, such as graphics processing units (GPUs) and central processing units (CPUs), may be used to perform a wide variety of operations within computing devices. For example, a GPU may be a graphics rendering device utilized to manipulate and display computerized graphics on a display. GPUs are built with a highly parallel structure that may provide more efficient processing than typical, general purpose central processing units (CPUs) for a range of complex algorithms. A processing unit typically includes a plurality of general purpose registers (GPRs) that are used to store data. When performing an operation, a processing unit typically executes instructions that cause the processing unit to move values amongst the GPRs.

SUMMARY

In general, this disclosure describes a processing unit that uses pipeline registers to move values between GPRs. A processing unit may be configured to operate in accordance with an instruction set architecture (ISA) which may include a plurality of instructions, each instruction specifying a particular operation that may be executed by the processing unit. As one example, a move instruction included in the ISA may specify that a value be moved from a source GPR to a destination GPR.

In one example, a method includes receiving, by a processing unit, one or more instructions requesting that a first value be moved from a first GPR of a plurality of GPRs to a third GPR of the plurality of GPRs and that a second value be moved from a second GPR of the plurality of GPRs to a fourth GPR of the plurality of GPRs. In this example, the method also includes, responsive to receiving the one or more instructions, copying, by an initial logic unit of the processing unit and during a first clock cycle, the first value to an initial pipeline register of a plurality of pipeline registers of a pipeline, wherein the plurality of pipeline registers are different than the plurality of GPRs, copying, by the initial logic unit of the processing unit and during a second clock cycle that is subsequent to the first clock cycle, the second value to the initial pipeline register, copying, by a final logic unit of the processing unit and during a third clock cycle that is subsequent to the second clock cycle, the first value from a final pipeline register of the plurality of pipeline registers to the third GPR, wherein the first value copied to the third GPR represents the same first value that was copied from the first GPR, and copying, by the final logic unit of the processing unit and during a fourth clock cycle that is subsequent to the second clock cycle, the second value from the final pipeline register to the fourth GPR, wherein the second value copied to the fourth GPR represents the same second value that was copied from the second GPR.

In another example, a processing unit includes a plurality of GPRs, a pipeline comprising a plurality of pipeline registers, wherein the plurality of pipeline registers are different than the plurality of GPRs, a plurality of logic units, and a controller. In this example, the control is configured to receive one or more instructions requesting that a first value be moved from a first GPR of the plurality of GPRs to a third GPR of the plurality of GPRs and that a second value be moved from a second GPR of the plurality of GPRs to a fourth GPR of the plurality of GPRs. In this example, in response to receiving the one or more instructions, the controller is configured to cause an initial logic unit of the plurality of logic unit to copy, during a first clock cycle, the first value to an initial pipeline register of the plurality of pipeline registers, cause the initial logic unit to copy, during a second clock cycle that is subsequent to the first clock cycle, the second value to the initial pipeline register, cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR, and cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

In another example, a non-transitory computer-readable storage medium stores one or more instructions for a processing unit requesting that a first value be moved from a first GPR of a plurality of GPRs to a third GPR of the plurality of GPRs and that a second value be moved from a second GPR of the plurality of GPRs to a fourth GPR of the plurality of GPRs. In this example, when executed, the one or more instructions cause the processing unit to: cause an initial logic unit of the plurality of logic unit to copy, during a first clock cycle, the first value to an initial pipeline register of a plurality of pipeline registers of a pipeline, cause the initial logic unit to copy, during a second clock cycle that is subsequent to the first clock cycle, the second value to the initial pipeline register, cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR, and cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

In another example, a method includes receiving, by a compiler module, code, and in response to determining, by the compiler module, that a plurality of operations indicated by the code can be combined into a combo-move instruction, generating the combo-move instruction. In this example, when executed by a processing unit, the generated combo-move instruction causes the processing unit to utilize a plurality of pipeline registers as temporary storage when moving a plurality of values from a plurality of source GPRs of a plurality of GPRs to a plurality of destination GPRs of the plurality of GPRs, and wherein the plurality of pipeline registers are different than the plurality of GPRs.

The details of one or more examples are set forth in the accompanying drawings and the description below. Other features, objects, and advantages of the invention will be apparent from the description and drawings, and from the claims.

BRIEF DESCRIPTION OF DRAWINGS

FIGS. 3A-3C are timing diagrams illustrating example data flows within a processing unit that uses pipeline registers to move values between GPRs when executing combo-move instructions, in accordance with one or more techniques of this disclosure.

DETAILED DESCRIPTION

Figure 1:
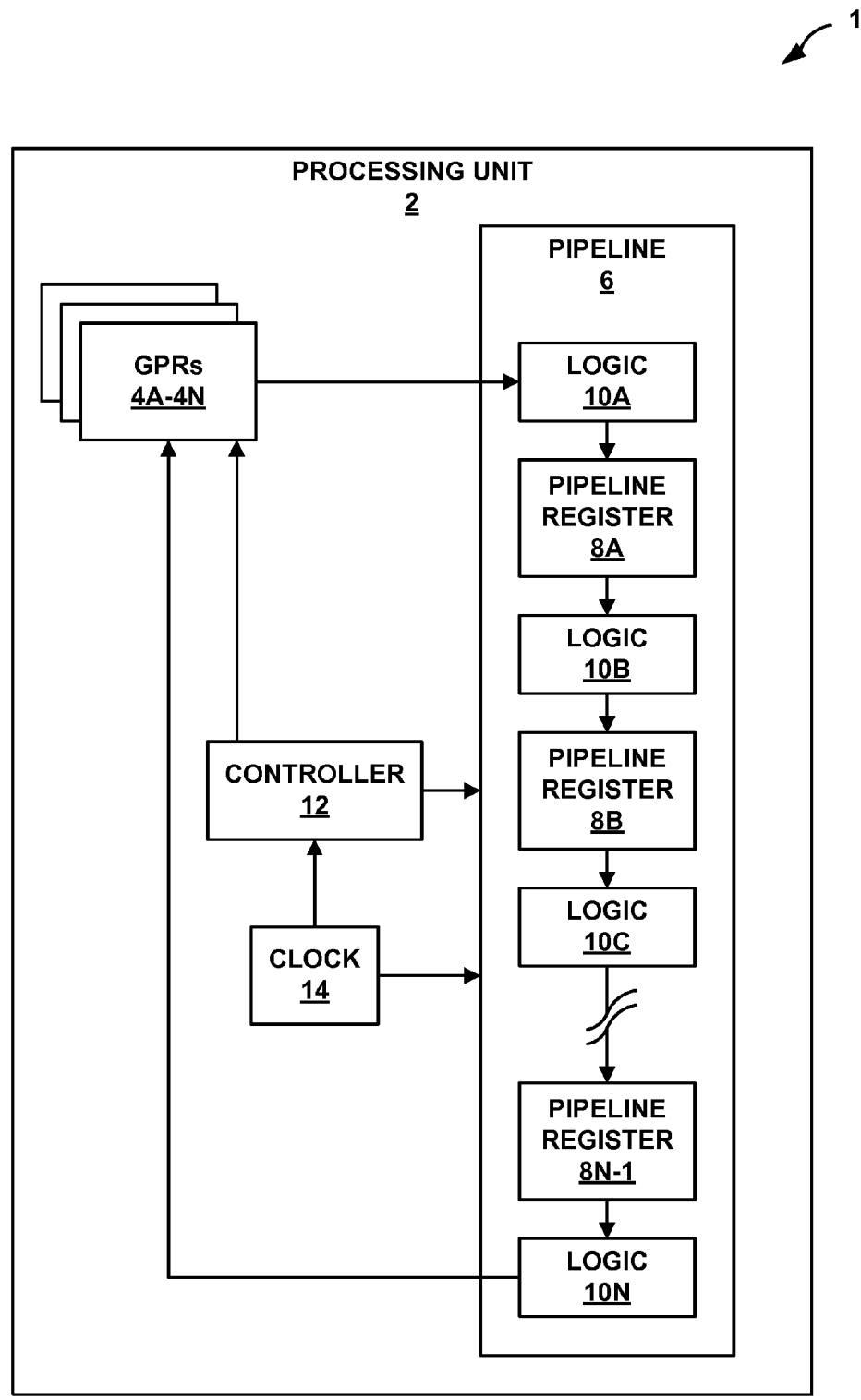
FIG. 1 is a block diagram illustrating an integrated circuit that includes an example processing unit that uses pipeline registers to move values between general purpose registers (GPRs) when executing combo-move instructions, in accordance with one or more techniques of this disclosure.

In general, this disclosure describes a processing unit that uses pipeline registers to move values between GPRs. A processing unit may be configured to operate in accordance with an instruction set architecture (ISA) which may include a plurality of instructions, each instruction specifying a particular operation that may be executed by the processing unit. As one example, a move instruction included in the ISA may specify that a value be moved from a source GPR to a destination GPR. In some examples, such as when moving multiple values between registers, it may be inefficient to execute a separate instruction for each move.

In accordance with one or more techniques of this disclosure, a combo-move instruction included in the ISA may specify that a plurality of values be moved from a plurality of source GPRs to a plurality of destination GPRs. In some examples, a particular GPR may be included in both the plurality of source GPRs and the plurality of destination GPRs. For instance, a combo-move instruction, such as a swap instruction, may specify that a first value stored in a first GPR be moved to a second GPR and that a second value stored in the second GPR be moved to the first GPR (e.g., swap values stored in the first and second GPRs). In some examples, in order to execute the combo-move instruction, a processing unit may utilize a third GPR to temporarily store one of the values during execution. For instance, a processing unit may copy the first value from the first GPR to the third GPR, copy the second value from the second GPR to the first GPR, and copy the first value from the third GPR to the second GPR.

In some examples, a processing unit may include one or more pipelines. Each of the pipelines may include a plurality of stages including at least an initial stage that may include an initial logic unit and an initial pipeline register, and a final stage that includes a final logic unit. As such, in some examples, an N-stage pipeline may include N logic units and N−1 pipeline registers and the pipeline register included in the N−$1^{st}$ stage may be referred to as a final pipeline register.

In operation, the initial logic unit of an N-stage pipeline may receive, from another component of the processing unit (e.g., a GPR), a value during a first clock cycle. During subsequent clock cycles, the value may pass through subsequent elements of the pipeline, and during an $N^{th}$ clock cycle, the value may be available for copying from the final stage. For instance, during a first clock cycle, an initial logic unit may receive a value, perform any requested logical operations on the value, and provide the value to an initial pipeline register such that, at the end of the first clock cycle, the initial pipeline register stores the value. Then, during a second clock cycle, a second logic unit may receive the value from the initial pipeline register, perform any requested logical operations on the value, and provide the value to a second pipeline register such that, at the end of the second clock cycle, the second pipeline register stores the value. If the pipeline is a three-stage pipeline (i.e., N=3), during a third clock cycle, a third logic unit may receive the value from the second pipeline register, perform any requested logical operations on the value, and provide the value to one or more other components of the processing unit (e.g., a GPR) such that, at the end of the third clock cycle, the one or more other components store the value.

In some examples, the initial logic unit may receive a second value before the first value has exited the pipeline (e.g., before the final logic unit has copied the first value to a GPR). For instance, during the second clock cycle, the initial logic unit may receive a second value, perform any requested logical operations on the second value, and provide the second value to the initial pipeline register such that, at the end of the second clock cycle, the initial pipeline register stores the second value. Additionally, as discussed in the above example where the value is a first value, at the end of the second clock cycle, the second pipeline register may store the first value. Then, during the third clock cycle, the second logic unit may receive the second value from the first pipeline register, perform any requested logical operations on the second value, and provide the second value to the second pipeline register such that, at the end of the second clock cycle, the second pipeline register stores the second value. In this way, a first value may be copied from a pipeline register and a second value may be copied to the pipeline register during a single clock cycle.

While the utilization of a temporary GPR enables the processing unit to complete execution of the instruction, in some examples, it may not be desirable to use the additional GPR. In accordance with one or more techniques of this disclosure, a processing unit may utilize a pipeline register of the processing unit as temporary storage, as opposed to using an additional GPR for temporary storage. For instance, when executing a swap instruction, a processing unit may copy, during a first cycle, a first value from a first GPR to an initial pipeline register of the pipeline, copy, during a second cycle, a second value from a second GPR to the initial register of the pipeline, copy, during a third cycle, the first value from a final pipeline register of the pipeline to the second GPR, and copy, during a fourth cycle, the second value from the final pipeline register to the first GPR. In other words, a processing unit may use the pipeline and its constituent pipeline registers as a first-in-first-out (FIFO) queue, in which values in each of the pipeline registers copies to the respective next pipeline register in a clock cycle. In this way, a processing unit may swap the values of two GPRs without using an additional GPR for temporary storage.

As described in more detail below, GPRs and pipeline registers are different, and accessing pipeline registers may require less power than accessing GPRs. Accordingly, by using the pipeline registers for temporary storage rather than GPRs, the techniques reduce power consumption, as well as avoid unnecessarily making a GPR unavailable (e.g., the GPR that would have otherwise been used for temporary storage).

FIG. 1 is a block diagram illustrating integrated circuit 1 ("IC 1") that includes an example processing unit 2 that uses pipeline registers to move values between GPRs when executing combo-move instructions, in accordance with one or more techniques of this disclosure. In some examples, IC 1 may be included in a device such as a mobile computing device (e.g., a "smartphone"), a computing device (e.g., a desktop, a laptop, a server, and the like), a computing device module (e.g., a graphics card), a personal digital assistant (PDA), a handheld video game device, a game console, and/or a television device. In some examples, IC 1 may include a graphics processing unit (GPU) configured to manipulate and display computerized graphics on a display and/or a central processing unit (CPU) configured to perform general computing operations. For instance processing unit 2 may be a shader processor of a GPU. As illustrated in FIG. 1, IC 1 may include processing unit 2 which includes general purpose registers (GPRs) 4A-4N (collectively, "GPRs 4"), pipeline 6, controller 12, and clock 14.

In some examples, processing unit 2 may include GPRs 4 which may be configured to store data for use by processing unit 2. As GPRs 4 are general purpose registers, GPRs 4 may store a wide variety of information. An example of the information that the GPRs may store is data such as, but are not limited to, integer values, floating-point values, characters, and bit arrays. For instance, one or more of GPRs 4 may store vector components, such as graphical vectors. As such, in some examples, one or more of GPRs 4 may be considered vector registers. As another example, one or more of GPRs 4 may store addresses.

In some examples, all of GPRs 4 may have the same data capacity (i.e., GPRs 4 may all be the same size). For instance, each of GPRs 4 may have an 8-bit, 16-bit, 32-bit, or 64-bit data capacity. In some examples, GPRs 4 may be of varying sizes. For instance, a first GPR of GPRs 4 may have a 32-bit data capacity and a second GPR of GPRs 4 may have a 64-bit data capacity.

In some examples, processing unit 2 may include pipeline 6 which may be configured to process data. Pipeline 6 may be a multi-stage calculation pipeline that includes logical units 10A-10N (collectively "logical units 10"), in which each logical unit of logical units 10 represents a discrete stage. Pipeline 6 may include an initial stage (i.e., logic unit 10A) and a final stage (i.e., logic unit 10N). In some examples, pipeline 6 may also include one or more intermediate stages (i.e., logic unit 10B-logic unit 10N-1). In order to retain the values determined by one or more of the stages (e.g., one or more of logical units 10), pipeline 6 may include one of pipeline registers 8 after one or more of logical units 10. For instance, pipeline 6 may include pipeline register 8A after logic unit 10A. In some examples, pipeline 6 may not include a pipeline register after the final stage (i.e., logic unit 10N). As such, in some examples, where pipeline 6 includes N stages, may pipeline 6 may include N logic units 10 and N−1 pipeline registers 8 and pipeline register 8N−1 may be referred to as a final pipeline register.

As discussed above, pipeline 6 may include one or more logical units 10 which may be configured to process values. For instance, each of logical units 10 may be configured to receive data, perform one or more operations (e.g., one or more arithmetic operations such as adding two values, one or more logical operations such as ANDing two values, and/or one or more other mathematical operations), and output the result. In some examples, one or more of logical units 10 may be programmable. As one example, one or more of logical units 10 may be programmed to add two values. As another example, one or more of logical units 10 may be programmed to pass a value without modification. As another example, one or more of logical units 10 may be programmed to modify the data type of a value while passing the value. For instance, the techniques described in this disclosure utilize pipeline registers 8 for temporary storage to avoid the use of a general purpose register for temporary storage. Accordingly, in some examples such as where pipeline registers 8 are used for temporary storage, logical units 10 may be configured to pass a value either without modification or with modification of the data type. In some examples, controller 12 may program one or more of logical units 10. In some examples, one of more of logical units 10 may include an arithmetic logic unit (ALU).

Pipeline 6 may be configured to operate in response to a clock signal received from clock 14. For instance, in response to receiving an edge (e.g., a rising edge or a falling edge) of a clock signal received from clock 14, pipeline 6 may advance to the next cycle. As such, in some examples, the cycles of pipeline 6 may be referred to as clock cycles. In each cycle of pipeline 6, a logical unit of logical units 10 may receive an input value from an input register, process the input value to determine an output value, and provide the output value to an output register. In other words, in each cycle, the values may advance through pipeline 6. As one example, during a cycle, logical unit 10B may receive a first input value from pipeline register 8A, process the first input value to determine a first output value, and provide the first output value to pipeline register 8B. Also during the same cycle, logical unit 10A may receive a second input value from a GPR of GPRs 4, process the second input value to determine a second output value, and provide the second output value to pipeline register 8A. As such, during a single cycle, pipeline register 8A may both provide the first input value to logic unit 10B and receive the second output value from logic unit 10A. As yet another example, during a cycle, logical unit 10N may receive an input value from pipeline register 8N, process the input value to determine an output value, and provide the output value to a GPR of GPRs 4.

In some examples, such as where pipeline 6 is a multi-stage calculation pipeline, there may be a number of cycles between a first cycle in which a value is provided to the beginning of pipeline 6 (i.e., to logic 10A) until a last cycle in which a resulting value is available at the end of pipeline 6 (i.e., from logic 10N). In some examples, this number of cycles may be referred to as the latency of pipeline 6. In some examples, the latency of pipeline 6 may be equivalent to the number of stages included in pipeline 6. For instance, where pipeline 6 includes four stages, pipeline 6 may have a latency of four.

Also as discussed above, pipeline 6 may include one or more pipeline registers 8, each of which may be configured to store a value. For instance, a pipeline register of pipeline registers 8 may be configured to store an output value determined by a logic unit of logic units 10 during a cycle and provide the output value to another logic unit of logic units 10 during the next cycle. Additionally, each of pipeline registers 8 may not be individually accessible and/or addressable by software, such as instructions executed by controller 12. In some examples, processing unit 2 may consume a lesser amount of power when accessing a pipeline register of pipeline registers 8 than when accessing a GPR of GPRs 4. For instance, processing unit 2 may consume half as much power when accessing a pipeline register compared to when accessing a GPR. In some examples, each of pipeline registers 8 may have a data capacity greater than or equal to the data capacity of a GPR of GPRs 4.

As described above, pipeline registers 8 may not be individually accessible and/or addressable by software. For instance, an instruction could not move the value stored by an arbitrary pipeline register to another arbitrary pipeline register or an arbitrary GPR. This characteristic of pipeline registers 6 is in direct contrast to GPRs 4, each of which is individually accessible and/or addressable by software. Therefore, data may only be inserted into pipeline 6 at the pipeline's beginning (i.e., logic 10A) and may only be accessed (e.g., copied to a GPR) from pipeline 6 at the pipeline's end (i.e., logic 10N), and may not be accessed in between (e.g., data in pipeline registers 8A-8N cannot be accessed by components other than the respective subsequent logic unit and/or the initial logic unit).

Processing unit 2 may include controller 12 which may control the operation of one or more components of processing unit 2. For instance, controller 12 may control the operation of GPRs 4 and pipeline 6 in response to receiving instructions. Controller 12 may be a specific controller for processing unit 2 or a more general controller that controls the overall operation of device 1. In some examples, controller 12 may include an instruction decoder.

Figure 2:
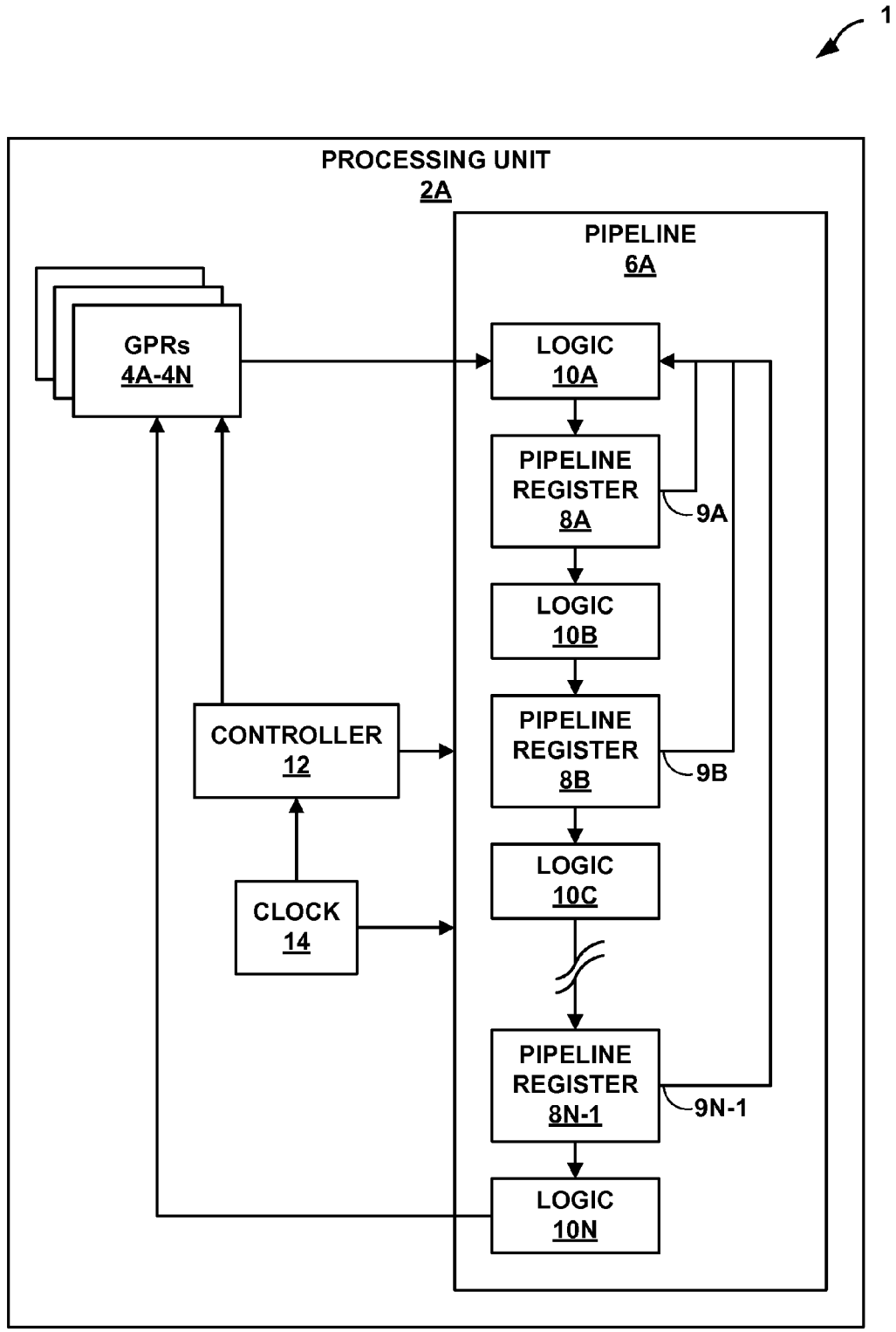
FIG. 2 is a block diagram illustrating an integrated circuit that includes an example processing unit that uses pipeline registers to move values between GPRs when executing combo-move instructions, in accordance with one or more techniques of this disclosure.

FIG. 2 is a block diagram illustrating integrated circuit 1 ("IC 1") that includes an example processing unit 2A that uses pipeline registers to move values between GPRs when executing combo-move instructions, in accordance with one or more techniques of this disclosure. Processing unit 2A may be similar to processing unit 2 of FIG. 1. For instance, processing unit 2A may use pipeline registers to move values between GPRs when executing combo-move instructions. As illustrated in FIG. 2, processing unit 2A may include general purpose registers (GPRs) 4A-4N (collectively, "GPRs 4"), pipeline 6A, controller 12, and clock 14. As GPRs 4, controller 12, and clock 14 are described above with reference to FIG. 1, additional description for GPRs 4, controller 12, and clock 14 is not provided for FIG. 2.

In some examples, processing unit 2A may include pipeline 6A which may be configured to process data. Pipeline 6A may be similar to pipeline 6 of FIG. 1. For instance, pipeline 6A may be a multi-stage pipeline that includes logic units 10 and pipeline registers 8. As illustrated in the example of FIG. 2, pipeline 6A may include bypass channels 9A-9N-1 (collectively, "bypass channels 9") each of which may be configured to enable the copying of a value from a respective pipeline register of pipeline registers 8 to initial logic unit 10A. For instance, logic unit 10A may utilize bypass channel 9B to copy a value from pipeline register 8B to pipeline register 8A.

FIGS. 3A-3C are timing diagrams illustrating example data flows within a processing unit that uses pipeline registers to move values between GPRs when executing combo-move instructions, in accordance with one or more techniques of this disclosure. The data flows of FIGS. 3A-3C may be representative of the data flow within a processing unit, such as processing unit 2 of FIG. 1 or processing unit 2A of FIG. 2. For purposes of illustration, the data flows of FIGS. 3A-3C are described within the context of processing unit 2 of FIG. 1, although processing units having configurations different than that of processing unit 2 may have data flows similar to the data flows of FIGS. 3A-3C.

Each of FIGS. 3A-3C illustrates an example data flow within a processing unit during execution of a particular combo-move instruction and includes a horizontal axis indicating a plurality of time cycles (e.g., $t_0$, $t_1$, etc.) and a vertical axis indicating a plurality of GPRs 4 and a plurality of pipeline registers 8 such that each of the data block identifies what value is stored by each register during each time cycle. FIG. 3A illustrates an example data flow within a processing unit during execution of a swizzle instruction, FIG. 3B illustrates an example data flow within a processing unit during execution of a gather instruction, and FIG. 3C illustrates an example data flow within a processing unit during execution of a scatter instruction.

In accordance with one or more techniques of this disclosure, controller 12 may be configured to control the operation of processing unit 2 in accordance with an instruction set architecture (ISA) that includes combo-move instructions by using pipeline registers as temporary storage when moving values between general purpose registers (GPRs). Some example combo-move instructions that may be included in the ISA executable by controller 12 include, but are not limited to, a swizzle instruction, a swap instruction, a gather instruction, and a scatter instruction. By using combo-move instructions, controller 12 may, as opposed to executing separate instructions for each move operations, be able to achieve the same end result, at least with respect to data locations, in fewer instruction cycles and thus achieve higher performance. In some examples, one or more of the combo-move instructions may be uninterruptable, meaning that controller 12 must complete execution of the uninterruptable instruction before executing another instruction.

Controller 12 may receive a swizzle instruction that instructs it to move a plurality of values from a plurality of arbitrary source GPRs to a plurality of arbitrary destination GPRs. For instance, controller 12 may receive a two-value swizzle instruction in accordance with instruction (1), below, where dst0 indicates a first destination GPR of GPRs 4, dst1 indicates a second destination GPR of GPRs 4, src0 indicates a first source GPR of GPRs 4, and src1 indicates a second source GPR of GPRs 4.

$$\text{swz dst0, dst1, src0, src1} \tag{1}$$

The behavior resulting from controller 12 executing an n-value swizzle instruction may be represented as follows:
dst0=convert(src0);
dst1=convert(src1); . . . ; and
dstn−1=convert(srcn−1).

In some examples, controller 12 may execute a two-value swizzle instruction in two instruction cycles. In some examples, instruction may use old sources if any sources are overwritten by the instruction itself.

FIG. 3A illustrates an example data flow through a processing unit during execution of a swap combo-move instruction, which is a type of swizzle instruction where a first GPR swaps values with a second GPR. For instance, the data flow illustrated by FIG. 3A may be the data flow within processing unit 2 during execution of the swizzle instruction swz 4B, 4A, 4A, 4B. In the following example, pipeline 6 may be a five stage pipeline that includes four pipeline registers (i.e., pipeline registers 8A-8D) interspersed between five logic units (i.e., logic units 10A-10E).

As illustrated in FIG. 3A, during time cycle $t_0$, GPR 4A may store value $V_A$ and GPR 4B may store value $V_B$. Also during time cycle $t_0$, controller 12 may cause $V_A$ to be copied to initial pipeline register 8A. As one example, controller 12 may cause logic 10A to receive $V_A$ from GPR 4A and pass $V_A$ to pipeline register 8A. As another example, such as where $V_A$ is stored by pipeline register 8B at the end of time cycle $t_1$ (e.g., the time cycle immediately prior to time cycle $t_0$), controller 12 may cause logic 10A to receive $V_A$ from pipeline register 8B via a bypass channel (i.e., bypass channel 9B of FIG. 2) and pass $V_A$ to pipeline register 8A.

Upon receiving a signal from clock 14, processing unit 2 may advance to time cycle $t_1$. During time cycle $t_1$, logic 10B may receive $V_A$ from pipeline register 8A and pass $V_A$ to pipeline register 8B. In other words, during time cycle $t_1$, logic 10B may copy $V_A$ to pipeline register 8B. Also during time cycle $t_1$, controller 12 may cause $V_B$ to be copied to initial pipeline register 8A. For instance, controller 12 may cause logic 10A to receive $V_B$ from GPR 4B and pass $V_B$ to pipeline register 8A.

Upon receiving a signal from clock 14, processing unit 2 may advance to time cycle $t_2$. During time cycle $t_2$, logic 10C may receive $V_A$ from pipeline register 8B and pass $V_A$ to pipeline register 8C. Also during time cycle $t_2$, logic 10B may receive $V_B$ from pipeline register 8A and pass $V_B$ to pipeline register 8B. In other words, during time cycle $t_2$ both $V_A$ and $V_B$ may advance such that $V_A$ is copied to pipeline register 8C and $V_B$ is copied to pipeline register 8B.

Upon receiving a signal from clock 14, processing unit 2 may advance to time cycle $t_3$. During time cycle $t_3$, logic 10D may receive $V_A$ from pipeline register 8C and pass $V_A$ to pipeline register 8D. Also during time cycle $t_3$, logic 10C may receive $V_B$ from pipeline register 8B and pass $V_B$ to pipeline register 8C. In other words, during time cycle $t_3$ both $V_A$ and $V_B$ may advance such that $V_A$ is copied to pipeline register 8D and $V_B$ is copied to pipeline register 8C.

Upon receiving a signal from clock 14, processing unit 2 may advance to time cycle $t_4$. During time cycle $t_4$, logic 10E may receive $V_A$ from pipeline register 8D and pass $V_A$ to GPR 4B. Also during time cycle $t_4$, logic 10D may receive $V_B$ from pipeline register 8C and pass $V_B$ to pipeline register 8D. In other words, during time cycle $t_4$ $V_A$ may be copied from final pipeline register 8D to GPR 4B such that the value stored in GPR 4B represents the same value that was stored in GPR 4A during time cycle $t_0$, and $V_B$ may advance such that $V_B$ is copied to pipeline register 8D. In some examples, such as where the instruction requested modification of the data type of VA, the value stored by GPR 4B may a representation of the value that was stored in GPR 4A during time cycle $t_0$, only with a different data type.

Upon receiving a signal from clock 14, processing unit 2 may advance to time cycle $t_5$. During time cycle $t_5$, logic 10E may receive $V_B$ from pipeline register 8D and pass $V_B$ to GPR 4A. In other words, during time cycle $t_5$ $V_B$ may be copied from final pipeline register 8D to GPR 4A such that GPR 4A stores the same value that was stored in GPR 4B during time cycle $t_0$. In this way, controller 12 may execute a swap/swizzle instruction without using an additional GPR for temporary storage (e.g., as opposed to copying during a first cycle, a first value from a first GPR to a temporary GPR, copying, during a second cycle, a second value from a second GPR to the first GPR, and copying, during a third cycle, the first value from the temporary GPR to the second GPR).

Controller 12 may receive a gather instruction that instructs it to move a plurality of values from a plurality of arbitrary source GPRs to a plurality of contiguously located destination GPRs. For instance, controller 12 may receive a four-value gather instruction in accordance with instruction (2), below, where dst indicates a first destination GPR of GPRs 4, src0 indicates a first source GPR of GPRs 4, src1 indicates a second source GPR of GPRs 4, src2 indicates a third source GPR of GPRs 4, and src3 indicates a fourth source GPR of GPRs 4.

$$\text{gat dst, src0, src1, src2, src3} \qquad (2)$$

The behavior resulting from controller 12 executing an n-value gather instruction may be represented as follows:
dst=convert(src0);
dst+1=convert(src1);
dst+2=convert(src2); . . . ; and
dst+n−1=convert(srcn−1).

In some examples, controller 12 may execute a four-value gather instruction in four instruction cycles. In some examples, instruction may use old sources if any sources are overwritten by the instruction itself.

FIG. 3B illustrates an example data flow through a processing unit during execution of a gather combo-move instruction. For instance, the data flow illustrated by FIG. 3B may be the data flow within processing unit 2 during execution of the three-value gather instruction gat 4B, 4E, 4B, 4D.

Controller 12 may receive a scatter instruction that instructs it to move a plurality of values from a plurality of contiguously located source GPRs to a plurality of arbitrary destination GPRs. For instance, controller 12 may receive a four-value gather instruction in accordance with instruction (3), below, where dst0 indicates a first destination GPR of GPRs 4, dst1 indicates a second destination GPR of GPRs 4, dst2 indicates a third destination GPR of GPRs 4, dst3 indicates a fourth destination GPR of GPRs 4, and src indicates a first source GPR of GPRs 4.

$$\text{sct dst0, dst1, dst2, dst3, src} \qquad (3)$$

The behavior resulting from controller 12 executing an n-value scatter instruction may be represented as follows:
dst=convert(src);
dst1=convert(src+1);
dst2=convert(src+1); . . . ; and
dstn−1=convert(src+n−1).

In some examples, controller 12 may execute a four-value gather instruction in four instruction cycles. In some examples, instruction may uses old sources if any sources are overwritten by the instruction itself.

FIG. 3C illustrates an example data flow through a processing unit during execution of a scatter combo-move instruction. For instance, the data flow illustrated by FIG. 3C may be the data flow within processing unit 2 during execution of the three-value scatter instruction gat 4B, 4E, 4B, 4D.

While described above as passing each copied value through pipeline 6, in some examples, controller 12 may execute a combo-move instruction by only passing a subset of the copied values through pipeline 6. For instance, when executing a three-value swizzle instruction, such as swz 4C, 4A, 4B, 4A, 4B, 4C, controller 12 may, during a first cycle, copy the value stored by GPR 4A to an initial pipeline register of pipeline registers 8, during a second cycle, copy the value stored by GPR 4C to GPR 4A, during a third cycle, copy the value stored by GPR 4B to GPR 4C, and during a fourth cycle, copy the value from a final pipeline register of pipeline registers 8 to GPR 4B. In some examples, such as where a particular GPR is not included in both the plurality of destination GPRs and the plurality of source GPRs, controller 12 may execute a combo-move instruction without passing any values through pipeline 6.

Figure 4:
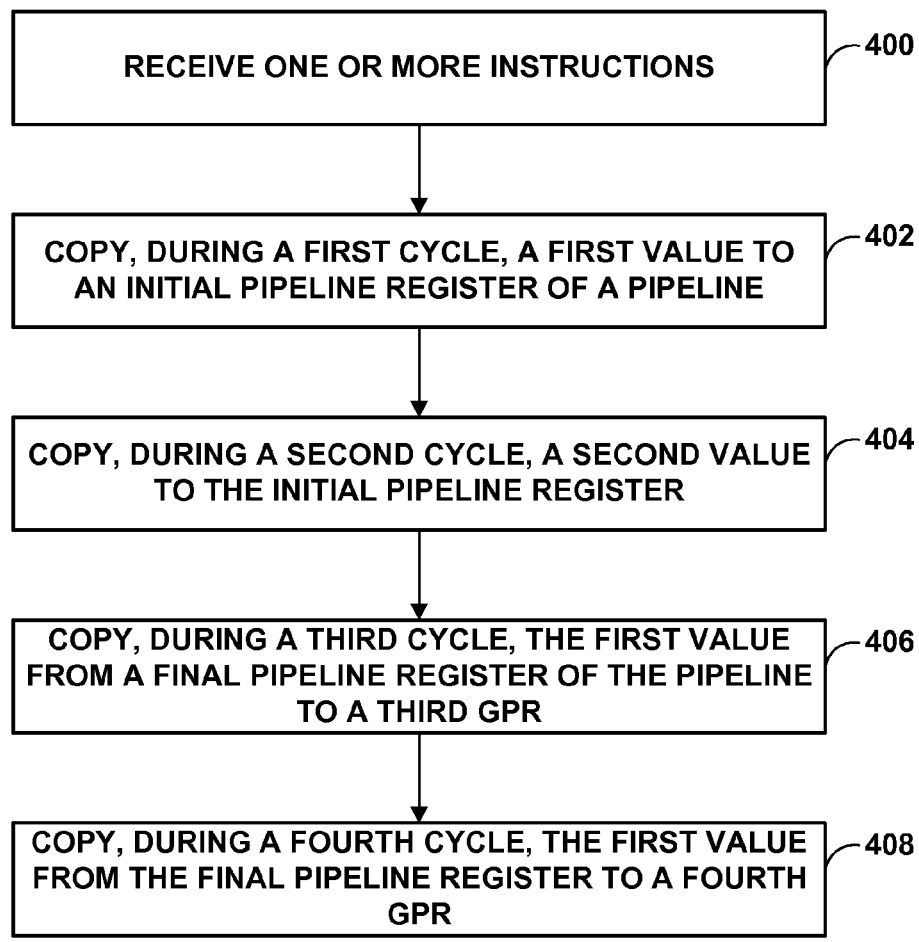
FIG. 4 is a flowchart illustrating example operations of a processing unit that uses pipeline registers to move values between GPRs when executing combo-move instructions, in accordance with one or more techniques of this disclosure.

FIG. 4 is a flowchart illustrating example operations of a processing unit that uses pipeline registers to move values between GPRs when executing combo-move instructions, in accordance with one or more techniques of this disclosure. The techniques of FIG. 4 may be performed by a processing unit, such as processing unit 2 illustrated in FIG. 1 or processing unit 2A illustrated in FIG. 2. For purposes of illustration, the techniques of FIG. 4 are described within the context of processing unit 2 of FIG. 1, although processing units having configurations different than that of processing unit 2 may perform the techniques of FIG. 4.

In accordance with one or more techniques of this disclosure, controller 12 of processing unit 2 may receive one or more instructions. For instance, controller 12 may receive one or more instructions requesting that a first value be moved from a first GPR of a plurality of GPRs to a third GPR of the plurality of GPRs and that a second value be moved from a second GPR of the plurality of GPRs to a fourth GPR of the plurality of GPRs (400). In some examples, the instruction may further request the one or both of the data types of the first value and/or the second value be converted. For instance, where the first value is stored in the first GPR as an integer, the instruction may request that the first value be move to the third GPR and converted into a floating point value.

Responsive to receiving the one or more instructions, controller 12 may cause an initial logic unit of logic units 10 of pipeline 6 to copy, during a first cycle, a first value to an initial pipeline register of pipeline registers 8 of pipeline 6 (e.g., pipeline register 8A) (402). As one example, controller 12 may send a signal to the initial logic unit that causes the initial logic unit to retrieve the first value from the first GPR and store the first value to the initial pipeline register. As another example, where the first value is already stored by a particular pipeline register of pipeline registers 8, controller 12 may send a signal to the initial logic unit that causes the initial logic unit to retrieve the first value from the particular pipeline register and store the first value to the initial pipeline register. As discussed above, pipeline registers 8 are different than the plurality of GPRs 4. Additionally, as discussed above, processing unit 2 may consume less power when accessing a pipeline register of pipeline registers 8 than when accessing a GPR of GPRs 4. For instance, processing unit 2 may consume half as much power when accessing a pipeline register compared to when accessing a GPR. In some examples, such as where the instructions request a conversion of the data type of the first value, one or more of the logic units may perform the data type conversion. For instance, the initial logic unit may convert the first value from an integer data type to a floating point data type. The initial logic unit may copy, during a second cycle, a second value from a second GPR of GPRs 4 to the initial pipeline register (404). As one example, controller 12 may send a signal to the initial logic unit that causes the initial logic unit to retrieve the second value from the second GPR and store the second value to the initial pipeline register. As another example, where the second value is already stored by a particular pipeline register of pipeline registers 8, controller 12 may send a signal to the initial logic unit that causes the initial logic unit to retrieve the second value from the particular pipeline register and store the second value to the initial pipeline register. As discussed above, also during the second cycle, a subsequent logic unit of logic units 10 (e.g., logic unit 10B) may copy the first value to a subsequent pipeline register of pipeline registers 8 (e.g., pipeline register 8B). For instance, controller 12 may send a signal to the subsequent logic unit that causes the subsequent logic unit to retrieve the first value from the initial pipeline register and store the first value to the subsequent pipeline register.

If pipeline 6 is a two stage pipeline, the subsequent pipeline register may be a final pipeline register of pipeline registers 8 (e.g., pipeline register N−1). However, if pipeline 6 has greater than two stages, the first value and the second value may advance through the stages of pipeline 6 until the first value is stored in the final pipeline register. As such, there may be cycles between the second cycle and the third cycle.

A final logic unit of logic units 10 (e.g., logic unit 10N) may copy, during a third cycle, the first value from the final pipeline register to the third GPR (406). For instance, controller 12 may send a signal to the final logic unit that causes the final logic unit to retrieve the first value from the final pipeline register and store the first value to the third GPR. As discussed above, also during the third cycle, the N−$1^{st}$ logic unit (i.e., the second to last logic unit) may copy the second value from the N−$1^{st}$ pipeline register (i.e., the second to last pipeline register) to the final pipeline register.

The final logic unit may copy, during a fourth cycle, the second value from the final pipeline register to the fourth GPR (408). For instance, controller 12 may send a signal to the final logic unit that causes the final logic unit to retrieve the second value from the final pipeline register and store the second value to the fourth GPR. As discussed above, controller 12 may cause the logic units to copy the values (i.e., perform operations 402-408) in response to receiving a single instruction, such as a combo-move instruction.

Figure 5:
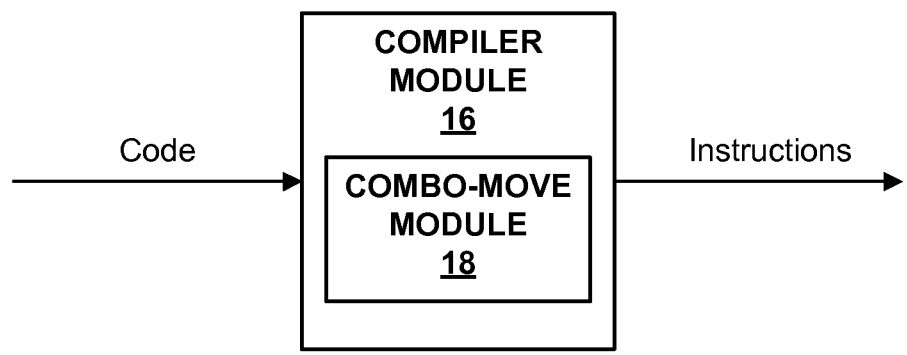
FIG. 5 is a block diagram illustrating an example compiler module that outputs combo-move instructions, in accordance with one or more techniques of this disclosure.

FIG. 5 is a block diagram illustrating example compiler module 16 that outputs combo-move instructions, in accordance with one or more techniques of this disclosure. As illustrated in the example of FIG. 5, compiler module 16 may receive code and output instructions. Compiler module 16 may output the instructions for execution by a processing unit, such as processing unit 2 of FIG. 1 or processing unit 2A of FIG. 2, which includes a plurality of GPRs and a pipeline that includes a plurality of pipeline registers. In some examples, compiler module 16 may be included in the same device as the processing unit. Additionally, as illustrated in the example of FIG. 5, compiler module 16 may include combo-move module 18.

Combo-move module 18 may be configured to determine whether a plurality of operations indicated by the received code can be combined into a combo-move instruction. For instance, combo-move module 18 may analyze the code to determine whether a plurality of operations indicated by the code include moving a plurality of values amongst the plurality of GPRs of the processing unit. In any event, responsive to determining that the plurality of operations indicated by the code can be combined into a combo-move instruction, combo-move module 18 may generate a single combo-move instruction that, when executed by a processing unit, achieves the same result as the plurality of operations. As one example, if the plurality of operations indicated by the code include moving a first value from a first GPR to a temporary GPR, moving a second value from a second GPR to the first GPR, and moving the first value from the temporary GPR to the second GPR, combo-move module may generate a single swizzle instruction that achieves the same result in fewer instruction cycles.

In some examples, compiler module 16 may receive uncompiled code. In such examples, compiler module 16 may compile the code into instructions. In some examples, combo-move module 18 may determine whether a plurality of operations indicated by the code can be combined into a combo-move instruction during the compilation process. In some examples, combo-move module 18 may determine whether a plurality of operations indicated by the code can be combined into a combo-move instruction after the compilation process has completed. In some examples, compiler module 16 may receive compiled code (e.g., instructions). In such examples, combo-move module 18 may analyze the instructions included in the code to determine whether any of the instructions can be combined into a combo-move instruction.

Figure 6:
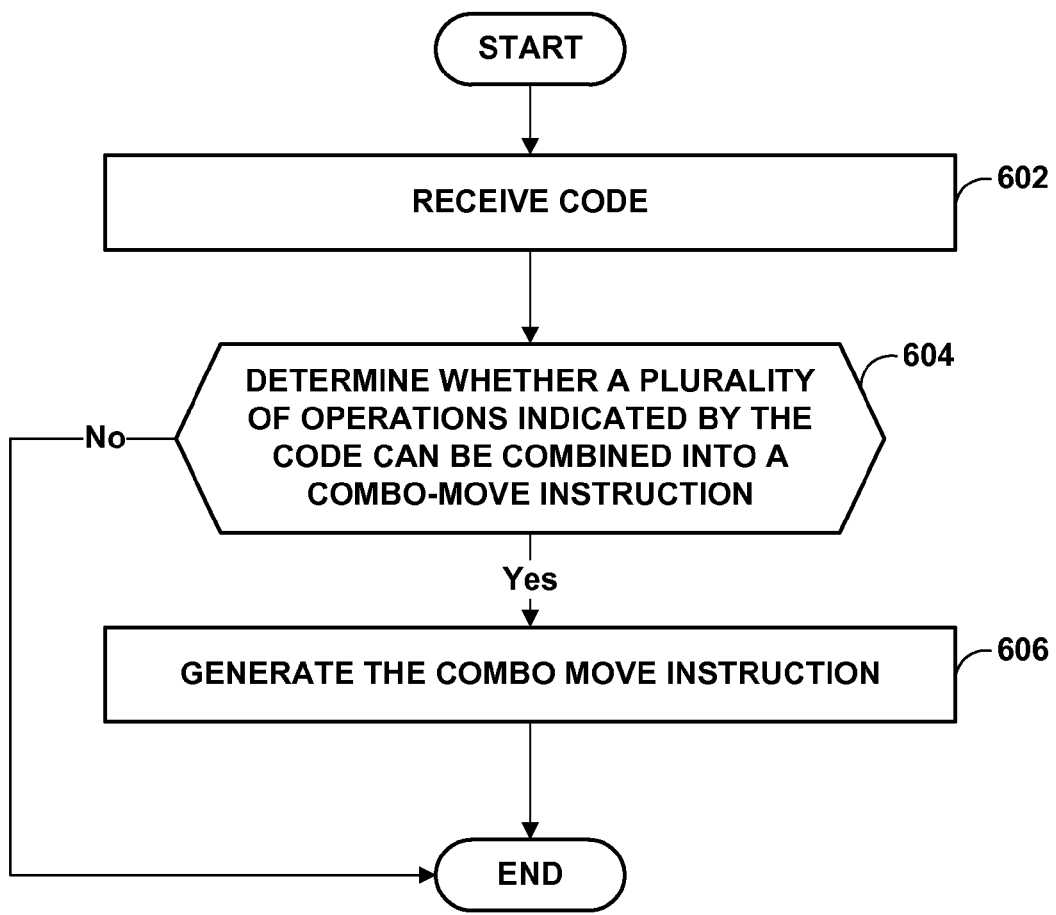
FIG. 6 is a flowchart illustrating example operations of a compiler module that outputs combo-move instructions, in accordance with one or more techniques of this disclosure.

FIG. 6 is a flowchart illustrating example operations of a compiler module that outputs combo-move instructions, in accordance with one or more techniques of this disclosure. The techniques of FIG. 6 may be performed by a compiler module, such as compiler module 16 illustrated in FIG. 5. For purposes of illustration, the techniques of FIG. 6 are described within the context of compiler module 16 of FIG. 5, although compiler modules having configurations different than that of compiler module 16 may perform the techniques of FIG. 6.

In accordance with one or more techniques of this disclosure, compiler module 16 may receive code (602). As discussed above, the code may be compiled code or uncompiled code. Combo-move module 18 of compiler module 16 may determine whether a plurality of operations indicated by the code can be combined into a combo-move instruction (604). In response to determining that the plurality of operations indicated by the code can be combined into the combo-move instruction, combo-move module 18 may generate the combo-move instruction (606). As discussed above, some example combo-move instructions include a swizzle instruction, a gather instruction, and a scatter instruction. Also as discussed above, where the code includes a plurality of instructions, combo-move module 18 may replace the instructions corresponding to the plurality of operations that can be combined into the combo-move instruction with the generated combo-move instruction. In this way, combo-move module 18 may reduce the number of instructions needed to perform the operations. Also in this way, combo-move module 18 may reduce the number of instruction cycles needed by a processing module to perform the operations.

In any case, compiler module 16 may output the compiled instructions. In some examples, the complied instructions may identify specific GPRs (e.g., the address/location of the specific GPRs) to be used when executing the instructions. In some examples, the compiled instructions may, as opposed to identifying specific GPRs, include variables which may be assigned to specific GPRs by the executing device (e.g., controller 12 of FIG. 1).

Figure 7:
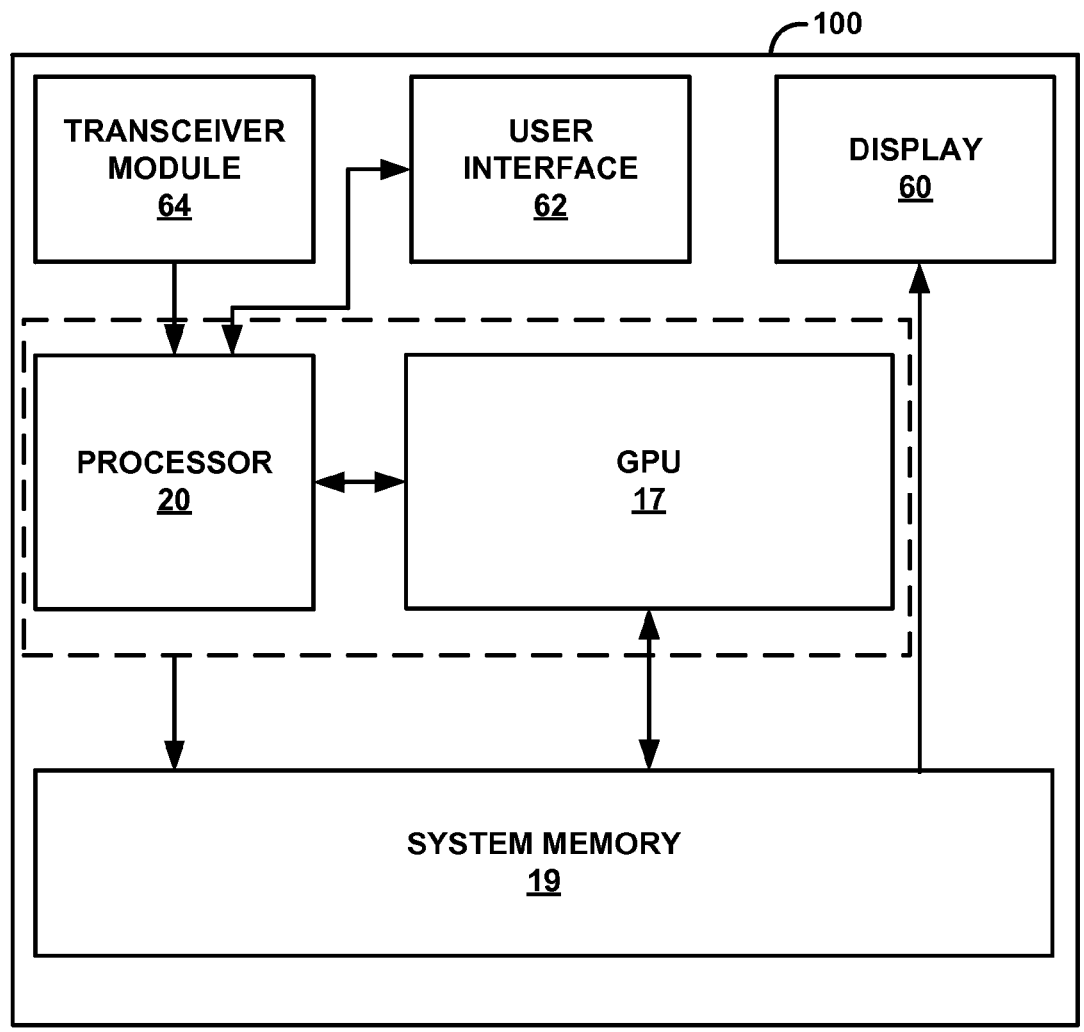
FIG. 7 is a block diagram illustrating an example device 100 that includes the integrated circuit of FIG. 1, in accordance with one or more techniques of the disclosure.

FIG. 7 is a block diagram illustrating an example device 100 that includes the integrated circuit of FIG. 1, in accordance with one or more techniques of the disclosure. Examples of device 100 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 100 includes GPU 17, system memory 19, and processor 20. In the example illustrated in FIG. 6, GPU 17 and processor 20 are illustrated in dashed lines to indicate that GPU 17 and processor 20 may be formed in the same integrated circuit. In some examples, GPU 17 and processor 20 may be formed in other integrated circuits (i.e., be in different chips). In some examples, one or both of GPU 17 and processor 20 may be examples of integrated circuit 1 of FIG. 1. For instance, one or both of GPU 17 and processor 20 may be configured to utilize a plurality of pipeline registers as temporary storage when moving a plurality of values from a plurality of source general purpose registers (GPRs) of a plurality of GPRs to a plurality of destination GPRs of the plurality of GPRs.

System memory 19 may be considered as the memory for device 100. System memory 19 may comprise one or more computer-readable storage media. Examples of system memory 19 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, system memory 19 may include instructions that cause processor 20 and/or GPU 17 to perform the functions ascribed to processor 20 and GPU 17 in this disclosure. Accordingly, system memory 19 may be a computer-readable storage medium having instructions stored thereon that, when executed, cause one or more processors (e.g., processor 20 and GPU 17) to perform various functions. System memory 19 may store instructions cause GPU 17 and/or processor 20 to implement the example techniques described in this disclosure.

System memory 19 may, in some examples, be considered as a non-transitory storage medium. The term "non-transitory" may indicate that the storage medium is not embodied in a carrier wave or a propagated signal. However, the term "non-transitory" should not be interpreted to mean that system memory 19 is non-movable or that its contents are static. As one example, system memory 19 may be removed from device 100, and moved to another device. As another example, memory, substantially similar to system memory 19, may be inserted into device 100. In certain examples, a non-transitory storage medium may store data that can, over time, change (e.g., in RAM).

Examples of processor 20 and GPU 17 include, but are not limited to, a digital signal processor (DSP), general purpose microprocessor, application specific integrated circuit (ASIC), field programmable logic array (FPGA), or other equivalent integrated or discrete logic circuitry. In some examples, GPU 17 may be specialized hardware that includes integrated and/or discrete logic circuitry that provides GPU 17 with massive parallel processing capabilities suitable for graphics processing. In some instances, GPU 17 may also include general purpose processing capabilities, and may be referred to as a general purpose GPU (GPGPU) when implementing general purpose processing tasks (i.e., non-graphics related tasks).

Processor 20 may execute various types of applications. Examples of the applications include web browsers, e-mail applications, spreadsheets, video games, or other applications that generate viewable objects for display. Instructions for execution of the one or more applications may be stored within system memory 19. Processor 20 may transmit graphics data of the viewable objects to GPU 17 for further processing.

For instance, processor 120 may offload processing tasks to GPU 17, such as tasks that require massive parallel operations. As one example, graphics processing requires massive parallel operations, and processor 20 may offload such graphics processing tasks to GPU 17. Processor 20 may communicate with GPU 17 in accordance with a particular application processing interface (API). Examples of such APIs include the DirectX® API by Microsoft®, the OpenGL® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and processor 20 and GPU 17 may utilize any technique for communication.

To perform graphics operations, GPU 17 may implement a graphics processing pipeline. The graphics processing pipeline includes performing functions as defined by software or firmware executing on GPU 17 and performing functions by fixed-function units that are hardwired to perform very specific functions. The software or firmware executing on the GPU 17 may be referred to as shader programs (or simply shaders), and the shader programs may execute on one or more shader cores of GPU 17 (also referred to as shader processors). Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

For example, processor 20 may execute an application, such as a video game, and processor 20 may generate graphics data as part of the execution. Processor 20 may output the graphics data for processing by GPU 17. GPU 17 may then process the graphics data in the graphics pipeline. In some examples, to process the graphic data, GPU 17 may need to execute one or more shader programs. For example, the application executing on processor 20 may cause processor 20 to instruct GPU 17 to retrieve a shader program from system memory 19 and instruct GPU 17 to execute the shader program.

There are various types of shader programs such as vertex shaders, hull shaders, domain shaders, geometry shaders, and fragment shaders. Each of these example shader programs may form some part of the graphics pipeline. For instance, a fixed-function unit of GPU 17 may output data to the shader core executing one or more of the example shader programs and one or more of the example shader programs may process the data and output the resulting data to another fixed-function unit of GPU 17. It may also be possible for a shader program to receive data from another shader program or output data to another shader program. In this way, the shader programs are implemented as part of a graphics pipeline.

Device 100 may also include display 60, user interface 62, and transceiver module 64. Device 100 may include additional modules or units not shown in FIG. 7 for purposes of clarity. For example, device 100 may include a speaker and a microphone, neither of which are shown in FIG. 7, to effectuate telephonic communications in examples where device 100 is a mobile wireless telephone. Furthermore, the various modules and units shown in device 100 may not be necessary in every example of device 100. For example, user interface 62 and display 60 may be external to device 100 in examples where device 100 is a desktop computer. As another example, user interface 62 may be part of display 60 in examples where display 60 is a touch-sensitive or presence-sensitive display of a mobile device.

Examples of user interface 62 include, but are not limited to, a trackball, a mouse, a keyboard, and other types of input devices. User interface 62 may also be a touch screen and may be incorporated as a part of display 60. Transceiver module 64 may include circuitry to allow wireless or wired communication between device 100 and another device or a network. Transceiver module 64 may include modulators, demodulators, amplifiers and other such circuitry for wired or wireless communication. Display 60 may comprise a liquid crystal display (LCD), a cathode ray tube (CRT) display, a plasma display, a touch-sensitive display, a presence-sensitive display, or another type of display device.

EXAMPLE 1

A method comprising: receiving, by a processing unit, one or more instructions requesting that a first value be moved from a first general purpose register (GPR) of a plurality of GPRs to a third GPR of the plurality of GPRs and that a second value be moved from a second GPR of the plurality of GPRs to a fourth GPR of the plurality of GPRs; and responsive to receiving the one or more instructions: copying, by an initial logic unit of the processing unit and during a first clock cycle, the first value to an initial pipeline register of a plurality of pipeline registers of a pipeline, wherein the plurality of pipeline registers are different than the plurality of GPRs; copying, by the initial logic unit of the processing unit and during a second clock cycle that is subsequent to the first clock cycle, the second value to the initial pipeline register; copying, by a final logic unit of the processing unit and during a third clock cycle that is subsequent to the second clock cycle, the first value from a final pipeline register of the plurality of pipeline registers to the third GPR, wherein the first value copied to the third GPR represents the same first value that was copied from the first GPR; and copying, by the final logic unit of the processing unit and during a fourth clock cycle that is subsequent to the second clock cycle, the second value from the final pipeline register to the fourth GPR, wherein the second value copied to the fourth GPR represents the same second value that was copied from the second GPR.

EXAMPLE 2

The method of example 1, wherein the one or more instructions identify the first GPR, the second GPR, the third GPR, and the fourth GPR, and wherein the one or more instructions do not individually identify any of the pipeline registers.

EXAMPLE 3

The method of any combination of examples 1-2, wherein the plurality of pipeline registers are not individually accessible by instructions, and wherein the plurality of GPRs are individually accessible by instructions.

EXAMPLE 4

The method of any combination of examples 1-3, wherein the processing unit consumes less power when accessing a pipeline register of the plurality of pipeline registers than when accessing a GPR of the plurality of GPRs.

EXAMPLE 5

The method of any combination of examples 1-4, wherein the one or more instructions comprise a single uninterruptable instruction requesting that the first value be moved from the first GPR to the third GPR and that the second value be moved from the second GPR to the fourth GPR.

EXAMPLE 6

The method of any combination of examples 1-5, wherein the instruction is selected from the group consisting of: a swap instruction wherein the third GPR is the second GPR, and wherein the fourth GPR is the first GPR, a swizzle instruction wherein the plurality of GPRs are arbitrarily located, a gather instruction wherein the first GPR and the second GPR are not contiguously located, and wherein the third GPR and the fourth GPR are contiguously located, and a scatter instruction wherein the first GPR and the second GPR are contiguously located, and wherein the third GPR and the fourth GPR are not contiguously located.

EXAMPLE 7

The method of any combination of examples 1-6, wherein the pipeline is a multi-cycle calculation pipeline that includes one or more arithmetic logic units (ALUs).

EXAMPLE 8

The method of any combination of examples 1-7, further comprising: copying, by an intermediate logic unit, after the first clock cycle and before the third clock cycle, the first value from the initial pipeline register to an intermediate pipeline register of the plurality of pipeline registers; and copying, by the intermediate logic unit, after the second clock cycle and before the fourth clock cycle, the second value from the initial pipeline register to the intermediate pipeline register.

EXAMPLE 9

The method of any combination of examples 1-8, wherein the processing unit is comprised by a central processing unit (CPU) or a graphical processing unit (GPU).

EXAMPLE 10

The method of any combination of examples 1-9, wherein copying the first value to the initial pipeline register comprises either: copying the first value to the initial pipeline register from the first GPR; or copying the first value to the initial pipeline register from a pipeline register of the plurality of pipeline registers; and wherein copying the second value to the initial pipeline register comprises either: copying the second value to the initial pipeline register from the second GPR; or copying the second value to the initial pipeline register from a pipeline register of the plurality of pipeline registers.

EXAMPLE 11

The method of any combination of examples 1-10, wherein the third GPR is the second GPR and/or the fourth GPR is the first GPR.

EXAMPLE 12

A processing unit comprising: a plurality of general purpose registers (GPRs); a pipeline comprising a plurality of pipeline registers, wherein the plurality of pipeline registers are different than the plurality of GPRs; a plurality of logic units; and a controller configured to receive one or more instructions requesting that a first value be moved from a first GPR of the plurality of GPRs to a third GPR of the plurality of GPRs and that a second value be moved from a second GPR of the plurality of GPRs to a fourth GPR of the plurality of GPRs, wherein, in response to receiving the one or more instructions, the controller is configured to: cause an initial logic unit of the plurality of logic unit to copy, during a first clock cycle, the first value to an initial pipeline register of the plurality of pipeline registers; cause the initial logic unit to copy, during a second clock cycle that is subsequent to the first clock cycle, the second value to the initial pipeline register; cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR; and cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

EXAMPLE 13

The processing unit of example 12, wherein the one or more instructions identify the first GPR, the second GPR, the third GPR, and the fourth GPR, and wherein the one or more instructions do not individually identify any of the pipeline registers.

EXAMPLE 14

The processing unit of any combination of examples 12-13, wherein the plurality of pipeline registers are not individually accessible by instructions, and wherein the plurality of GPRs are individually accessible by instructions.

EXAMPLE 15

The processing unit of any combination of examples 12-14, wherein the processing unit consumes less power when accessing a pipeline register of the plurality of pipeline registers than when accessing a GPR of the plurality of GPRs.

EXAMPLE 16

The processing unit of any combination of examples 12-15, wherein the one or more instructions comprise a single uninterruptable instruction requesting that the first value be moved from the first GPR to the third GPR and that the second value be moved from the second GPR to the fourth GPR.

EXAMPLE 17

The processing unit of any combination of examples 12-16, wherein the instruction is selected from the group consisting of: a swap instruction wherein the third GPR is the second GPR, and wherein the fourth GPR is the first GPR, a swizzle instruction wherein the plurality of GPRs are arbitrarily located, a gather instruction wherein the first GPR and the second GPR are not contiguously located, and wherein the third GPR and the fourth GPR are contiguously located, and a scatter instruction wherein the first GPR wherein the first GPR and the second GPR are contiguously located, and wherein the third GPR and the fourth GPR are not contiguously located.

EXAMPLE 18

The processing unit of any combination of examples 12-17, wherein the pipeline is a multi-cycle calculation pipeline that includes one or more arithmetic logic units (ALUs).

EXAMPLE 19

The processing unit of any combination of examples 12-18, wherein, in response to receiving the one or more instructions, the controller is further configured to: cause an intermediate logic unit of the plurality of logic units to copy, after the first clock cycle and before the third clock cycle, the first value from the initial pipeline register to an intermediate pipeline register of the plurality of pipeline registers; and cause the intermediate logic unit to copy, after the second clock cycle and before the fourth clock cycle, the second value from the initial pipeline register to the intermediate pipeline register.

EXAMPLE 20

The processing unit of any combination of examples 12-19, wherein the processing unit is comprised by a central processing unit (CPU) or a graphical processing unit (GPU).

EXAMPLE 21

The processing unit of any combination of examples 12-20, wherein the initial logic unit is configured to copy the first value to the initial pipeline register by either: copying the first value to the initial pipeline register from the first GPR; or copying the first value to the initial pipeline register from a pipeline register of the plurality of pipeline registers; and wherein the initial logic unit is configured to copy the second value to the initial pipeline register by either: copying the second value to the initial pipeline register from the second GPR; or copying the second value to the initial pipeline register from a pipeline register of the plurality of pipeline registers.

EXAMPLE 22

The processing unit of any combination of examples 12-21, wherein the third GPR is the second GPR and/or the fourth GPR is the first GPR.

EXAMPLE 23

A non-transitory computer-readable storage medium storing one or more instructions for a processing unit requesting that a first value be moved from a first GPR of a plurality of GPRs to a third GPR of the plurality of GPRs and that a second value be moved from a second GPR of the plurality of GPRs to a fourth GPR of the plurality of GPRs, that when executed, cause the processing unit to: cause an initial logic unit of the plurality of logic unit to copy, during a first clock cycle, the first value to an initial pipeline register of a plurality of pipeline registers of a pipeline; cause the initial logic unit to copy, during a second clock cycle that is subsequent to the first clock cycle, the second value to the initial pipeline register; cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR; and cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

EXAMPLE 24

The non-transitory computer-readable storage medium of example 23, wherein the one or more instructions identify the first GPR, the second GPR, the third GPR, and the fourth GPR, and wherein the one or more instructions do not individually identify any of the pipeline registers.

EXAMPLE 25

The non-transitory computer-readable storage medium of any combination of examples 23-24, wherein the plurality of pipeline registers are not individually accessible by instructions, and wherein the plurality of GPRs are individually accessible by instructions.

EXAMPLE 26

The non-transitory computer-readable storage medium of any combination of examples 23-25, wherein the processing unit consumes less power when accessing a pipeline register of the plurality of pipeline registers than when accessing a GPR of the plurality of GPRs.

EXAMPLE 27

The non-transitory computer-readable storage medium of any combination of examples 23-26, wherein the processing unit copies the values in response to receiving a single uninterruptable instruction.

EXAMPLE 28

The non-transitory computer-readable storage medium of any combination of examples 23-27, wherein the instruction is selected from the group consisting of: a swap instruction wherein the third GPR is the second GPR, and wherein the fourth GPR is the first GPR, a swizzle instruction wherein the plurality of GPRs are arbitrarily located, a gather instruction wherein the first GPR and the second GPR are not contiguously located, and wherein the third GPR and the fourth GPR are contiguously located, and a scatter instruction wherein the first GPR wherein the first GPR and the second GPR are contiguously located, and wherein the third GPR and the fourth GPR are not contiguously located.

EXAMPLE 29

The non-transitory computer-readable storage medium of any combination of examples 23-28, wherein the pipeline is a multi-cycle calculation pipeline that includes one or more arithmetic logic units (ALUs).

EXAMPLE 30

The non-transitory computer-readable storage medium of any combination of examples 23-29, wherein, when executed, the one or more instructions cause the processing unit to: cause an intermediate logic unit of the plurality of logic units to copy, after the first clock cycle and before the third clock cycle, the first value from the initial pipeline register to an intermediate pipeline register of the plurality of pipeline registers; and cause the intermediate logic unit to copy, after the second clock cycle and before the fourth clock cycle, the second value from the initial pipeline register to the intermediate pipeline register.

EXAMPLE 31

The non-transitory computer-readable storage medium of any combination of examples 23-30, wherein the processing unit is comprised by a central processing unit (CPU) or a graphical processing unit (GPU).

EXAMPLE 32

The non-transitory computer-readable storage medium of any combination of examples 23-31, wherein the initial logic unit is configured to copy the first value to the initial pipeline register by either: copying the first value to the initial pipeline register from the first GPR; or copying the first value to the initial pipeline register from a pipeline register of the plurality of pipeline registers; and wherein the initial logic unit is configured to copy the second value to the initial pipeline register by either: copying the second value to the initial pipeline register from the second GPR; or copying the second value to the initial pipeline register from a pipeline register of the plurality of pipeline registers.

EXAMPLE 33

The non-transitory computer-readable storage medium of any combination of examples 23-32, wherein the third GPR is the second GPR and/or the fourth GPR is the first GPR.

EXAMPLE 34

A method comprising: receiving, by a compiler module, code; and in response to determining, by the compiler module, that a plurality of operations indicated by the code can be combined into a combo-move instruction, generating the combo-move instruction, wherein, when executed by a processing unit, the combo-move instruction causes the processing unit to utilize a plurality of pipeline registers as temporary storage when moving a plurality of values from a plurality of source general purpose registers (GPRs) of a plurality of GPRs to a plurality of destination GPRs of the plurality of GPRs, and wherein the plurality of pipeline registers are different than the plurality of GPRs.

EXAMPLE 35

The method of example 34, wherein determining that the plurality of operations indicated by the code can be combined into the combo-mode instruction comprises: in response to determining that the plurality of operations indicated by the code include moving a plurality of values amongst the plurality of GPRs, determining that the plurality of operations indicated by the code can be combined into the combo-mode instruction.

EXAMPLE 36

The method of any combination of examples 34-32, wherein the code comprises a plurality of instructions, and wherein the method further comprises: replacing the instructions corresponding to the plurality of operations that can be combined into the combo-move instruction with the generated combo-move instruction.

EXAMPLE 37

A device comprising means for performing any combination of the methods of examples 1-11 and/or examples 34-36.

EXAMPLE 38

A system comprising means for performing any combination of the methods of examples 1-11 and/or examples 34-36.

EXAMPLE 39

A device comprising: means for receiving, by a processing unit, one or more instructions requesting that a first value be moved from a first general purpose register (GPR) of a plurality of GPRs to a third GPR of the plurality of GPRs and that a second value be moved from a second GPR of the plurality of GPRs to a fourth GPR of the plurality of GPRs; and responsive to receiving the one or more instructions: means for copying, by an initial logic unit of the processing unit and during a first clock cycle, the first value to an initial pipeline register of a plurality of pipeline registers of a pipeline, wherein the plurality of pipeline registers are different than the plurality of GPRs; means for copying, by the initial logic unit of the processing unit and during a second clock cycle that is subsequent to the first clock cycle, the second value to the initial pipeline register; means for copying, by a final logic unit of the processing unit and during a third clock cycle that is subsequent to the second clock cycle, the first value from a final pipeline register of the plurality of pipeline registers to the third GPR, wherein the first value copied to the third GPR represents the same first value that was copied from the first GPR; and means for copying, by the final logic unit of the processing unit and during a fourth clock cycle that is subsequent to the second clock cycle, the second value from the final pipeline register to the fourth GPR, wherein the second value copied to the fourth GPR represents the same second value that was copied from the second GPR.

EXAMPLE 40

The device of example 40, further comprising means for performing any combination of the methods of examples 1-11.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
  receiving, by a processing unit, a single instruction requesting that a first value be moved from a first general purpose register (GPR) of a plurality of source GPRs of a plurality of GPRs to a third GPR of a plurality of destination GPRs of the plurality of GPRs, that a second value be moved from a second GPR of the plurality of source GPRs to a fourth GPR of the plurality destination of GPRs, and that a third value be moved from a fifth GPR of the plurality of source GPRs to a sixth GPR of the plurality of destination GPRs, wherein the single instruction is one of: a gather instruction that does not expressly identify all of the destination GPRs, wherein the plurality of source GPRs are not contiguously located when the single instruction is the gather instruction, and wherein the destination GPRs are contiguously located when the single instruction is the gather instruction, or a scatter instruction that does not expressly identify all of the source GPRs, wherein the source GPRs are contiguously located when the single instruction is the scatter instruction, and wherein the destination GPRs are not contiguously located when the single instruction is the scatter instruction, wherein the single instruction comprises a single uninterruptable instruction requesting that the first value be moved from the first GPR to the third GPR, that the second value be moved from the second GPR to the fourth GPR, and that the third value be moved from the fifth GPR to the sixth GPR; and
  responsive to receiving the single instruction:
    copying, by an initial logic unit of the processing unit and during a first clock cycle, the first value to an initial pipeline register of a plurality of pipeline registers of a pipeline, wherein the plurality of pipeline registers are different than the plurality of GPRs;
    copying, by the initial logic unit of the processing unit and during a second clock cycle that is subsequent to the first clock cycle, the second value to the initial pipeline register;
    copying, by a final logic unit of the processing unit and during a third clock cycle that is subsequent to the second clock cycle, the first value from a final pipeline register of the plurality of pipeline registers to the third GPR, wherein the first value copied to the third GPR represents the same first value that was copied from the first GPR; and
    copying, by the final logic unit of the processing unit and during a fourth clock cycle that is subsequent to the second clock cycle, the second value from the final pipeline register to the fourth GPR, wherein the second value copied to the fourth GPR represents the same second value that was copied from the second GPR.

2. The method of claim 1, wherein the single instruction does not individually identify any of the pipeline registers.

3. The method of claim 1, wherein the plurality of pipeline registers are not individually accessible by instructions, and wherein the plurality of GPRs are individually accessible by instructions.

4. The method of claim 1, wherein the processing unit consumes less power when accessing a pipeline register of the plurality of pipeline registers than when accessing a GPR of the plurality of GPRs.

5. The method of claim 1, wherein the pipeline is a multi-cycle calculation pipeline that includes one or more arithmetic logic units (ALUs).

6. The method of claim 1, further comprising:
  copying, by an intermediate logic unit, after the first clock cycle and before the third clock cycle, the first value from the initial pipeline register to an intermediate pipeline register of the plurality of pipeline registers; and
  copying, by the intermediate logic unit, after the second clock cycle and before the fourth clock cycle, the second value from the initial pipeline register to the intermediate pipeline register.

7. The method of claim 1, wherein the processing unit is comprised by a central processing unit (CPU) or a graphical processing unit (GPU).

8. The method of claim 1,
wherein copying the first value to the initial pipeline register comprises either:
copying the first value to the initial pipeline register from the first GPR; or
copying the first value to the initial pipeline register from a pipeline register of the plurality of pipeline registers; and
wherein copying the second value to the initial pipeline register comprises either:
copying the second value to the initial pipeline register from the second GPR; or
copying the second value to the initial pipeline register from a pipeline register of the plurality of pipeline registers.

9. A processing unit comprising:
a plurality of general purpose registers (GPRs);
a pipeline comprising a plurality of pipeline registers, wherein the plurality of pipeline registers are different than the plurality of GPRs;
a plurality of logic units; and
a controller configured to receive a single instruction requesting that a first value be moved from a first GPR of a plurality of source GPRs of the plurality of GPRs to a third GPR of a plurality of destination GPRs of the plurality of GPRs, that a second value be moved from a second GPR of the plurality of source GPRs to a fourth GPR of the plurality of destination GPRs, and that a third value be moved from a fifth GPR of the plurality of source GPRs to a sixth GPR of the plurality of destination GPRs, wherein the single instruction is one of: a gather instruction that does not expressly identify all of the destination GPRs, wherein the plurality of source GPRs are not contiguously located when the single instruction is the gather instruction, and wherein the destination GPRs are contiguously located when the single instruction is the gather instruction, or a scatter instruction that does not expressly identify all of the source GPRs, wherein the source GPRs are contiguously located when the single instruction is the scatter instruction, and wherein the destination GPRs are not contiguously located when the single instruction is the scatter instruction, wherein the single instruction comprises a single uninterruptable instruction requesting that the first value be moved from the first GPR to the third GPR, that the second value be moved from the second GPR to the fourth GPR, and that the third value be moved from the fifth GPR to the sixth GPR, and wherein, in response to receiving the single instruction, the controller is configured to:
cause an initial logic unit of the plurality of logic unit to copy, during a first clock cycle, the first value to an initial pipeline register of the plurality of pipeline registers;
cause the initial logic unit to copy, during a second clock cycle that is subsequent to the first clock cycle, the second value to the initial pipeline register;
cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR; and
cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

10. The processing unit of claim 9, wherein the single instruction does not individually identify any of the pipeline registers.

11. The processing unit of claim 9, wherein the plurality of pipeline registers are not individually accessible by instructions, and wherein the plurality of GPRs are individually accessible by instructions.

12. The processing unit of claim 9, wherein the processing unit consumes less power when accessing a pipeline register of the plurality of pipeline registers than when accessing a GPR of the plurality of GPRs.

13. The processing unit of claim 9, wherein the pipeline is a multi-cycle calculation pipeline that includes one or more arithmetic logic units (ALUs).

14. The processing unit of claim 9, wherein, in response to receiving the one or more instructions, the controller is further configured to:
cause an intermediate logic unit of the plurality of logic units to copy, after the first clock cycle and before the third clock cycle, the first value from the initial pipeline register to an intermediate pipeline register of the plurality of pipeline registers; and
cause the intermediate logic unit to copy, after the second clock cycle and before the fourth clock cycle, the second value from the initial pipeline register to the intermediate pipeline register.

15. The processing unit of claim 9, wherein the processing unit is comprised by a central processing unit (CPU) or a graphical processing unit (GPU).

16. The processing unit of claim 9,
wherein the initial logic unit is configured to copy the first value to the initial pipeline register by either:
copying the first value to the initial pipeline register from the first GPR; or
copying the first value to the initial pipeline register from a pipeline register of the plurality of pipeline registers; and
wherein the initial logic unit is configured to copy the second value to the initial pipeline register by either:
copying the second value to the initial pipeline register from the second GPR; or
copying the second value to the initial pipeline register from a pipeline register of the plurality of pipeline registers.

17. A non-transitory computer-readable storage medium storing a single instruction for a processing unit requesting that a first value be moved from a first general purpose register (GPR) of a plurality of source GPRs of a plurality of GPRs to a third GPR of a plurality of destination GPRs of the plurality of GPRs, that a second value be moved from a second GPR of the plurality of source GPRs to a fourth GPR of the plurality of destination GPRs, and that a third value be moved from a fifth GPR of the plurality of source GPRs to a sixth GPR of the plurality of destination GPRs, wherein the single instruction is one of: a gather instruction that does not expressly identify all of the destination GPRs, wherein the plurality of source GPRs are not contiguously located when the single instruction is the gather instruction, and wherein the destination GPRs are contiguously located when the single instruction is the gather instruction, or a scatter instruction that does not expressly identify all of the source GPRs, wherein the source GPRs are contiguously located when the single instruction is the scatter instruction, and wherein the destination GPRs are not contiguously located when the single instruction is the scatter instruction, wherein the single instruction comprises a single uninterruptable instruction requesting that the first value be moved from the first GPR to the third GPR, that the second value be moved from the second GPR to the fourth GPR, and that the third value be moved from the fifth GPR to the sixth GPR, and wherein, when executed, the single instruction causes the processing unit to:

cause an initial logic unit of the plurality of logic unit to copy, during a first clock cycle, the first value to an initial pipeline register of a plurality of pipeline registers of a pipeline;

cause the initial logic unit to copy, during a second clock cycle that is subsequent to the first clock cycle, the second value to the initial pipeline register;

cause a final logic unit of the plurality of logic unit to copy, during a third clock cycle that is subsequent to the second clock cycle, the first value from a final pipeline register of the plurality of pipeline registers to the third GPR, wherein the first value copied to the third GPR represents the same first value that was copied from the first GPR; and cause the final logic unit to copy, during a fourth clock cycle that is subsequent to the second clock cycle, the second value from the final pipeline register to the fourth GPR, wherein the second value copied to the fourth GPR represents the same second value that was copied from the second GPR.

18. The non-transitory computer-readable storage medium of claim 17, wherein the single instruction does not individually identify any of the pipeline registers.

19. The non-transitory computer-readable storage medium of claim 17, wherein the plurality of pipeline registers are not individually accessible by instructions, and wherein the plurality of GPRs are individually accessible by instructions.

20. The non-transitory computer-readable storage medium of claim 17, wherein the processing unit consumes less power when accessing a pipeline register of the plurality of pipeline registers than when accessing a GPR of the plurality of GPRs.

21. The non-transitory computer-readable storage medium of claim 17, wherein, when executed, the single instruction causes the processing unit to:

cause an intermediate logic unit of the plurality of logic units to copy, after the first clock cycle and before the third clock cycle, the first value from the initial pipeline register to an intermediate pipeline register of the plurality of pipeline registers; and cause the intermediate logic unit to copy, after the second clock cycle and before the fourth clock cycle, the second value from the initial pipeline register to the intermediate pipeline register.

22. A method comprising:

receiving, by a compiler module, code; and in response to determining, by the compiler module, that a plurality of operations indicated by the code can be combined into a single combo-move instruction, generating the single combo-move instruction, wherein, when executed by a processing unit, the combo-move instruction causes the processing unit to utilize a plurality of pipeline registers as temporary storage when moving a plurality of values from a plurality of source general purpose registers (GPRs) of a plurality of GPRs to a plurality of destination GPRs of the plurality of GPRs, wherein the single combo-move instruction is one of: a gather instruction that does not expressly identify all of the destination GPRs, wherein the plurality of source GPRs are not contiguously located when the single instruction is the gather instruction, and wherein the destination GPRs are contiguously located when the single instruction is the gather instruction, or a scatter instruction that does not expressly identify all of the source GPRs, wherein the source GPRs are contiguously located when the single instruction is the scatter instruction, and wherein the destination GPRs are not contiguously located when the single instruction is the scatter instruction, and wherein at least one GPR of the plurality of source GPRs is included in the plurality of destination GPRs, and wherein the plurality of pipeline registers are different than the plurality of GPRs, and wherein the single instruction comprises a single uninterruptable instruction requesting that the first value be moved from the first GPR to the third GPR, that the second value be moved from the second GPR to the fourth GPR, and that the third value be moved from the fifth GPR to the sixth GPR.

23. The method of claim 22, wherein determining that the plurality of operations indicated by the code can be combined into the single combo-mode instruction comprises:

in response to determining that the plurality of operations indicated by the code include moving a plurality of values amongst the plurality of GPRs, determining that the plurality of operations indicated by the code can be combined into the single combo-mode instruction.

24. The method of claim 22, wherein the code comprises a plurality of instructions, and wherein the method further comprises:

replacing the instructions corresponding to the plurality of operations that can be combined into the single combo-move instruction with the generated single combo-move instruction.

* * * * *